United States Patent [19]
Filas et al.

[11] Patent Number: 6,081,646
[45] Date of Patent: Jun. 27, 2000

[54] IN-LINE SOLDER SEAL FOR OPTICAL FIBER

[75] Inventors: Robert W. Filas, Bridgewater, Somerset County, N.J.; Ralph Salvatore Moyer, Mohnton, Berks County; Craig G. Smith, Trexlertown, Lehigh County, both of Pa.

[73] Assignee: Lucent Technologies Inc., Murray Hill, N.J.

[21] Appl. No.: 08/863,432

[22] Filed: May 27, 1997

[51] Int. Cl.[7] .................................................. G02B 6/00
[52] U.S. Cl. ............................................................ 385/138
[58] Field of Search ................... 385/86, 88, 91, 385/94, 138, 147; 156/294; 174/11 R, 705; 403/284, 179

[56] References Cited

U.S. PATENT DOCUMENTS

| | | | |
|---|---|---|---|
| 4,119,363 | 10/1978 | Camlibel et al. | 388/88 |
| 4,252,457 | 2/1981 | Benson et al. | 403/284 |
| 4,657,346 | 4/1987 | Berry et al. | 385/138 |
| 4,699,456 | 10/1987 | Mackenzie | 385/88 |
| 4,756,592 | 7/1988 | Sasayama et al. | 385/88 |
| 4,826,276 | 5/1989 | Abbott et al. | 385/138 |

*Primary Examiner*—Akm E. Ullah

[57] ABSTRACT

An in-line hermetic seal for an optical fiber which has an outer diameter and a stripped mid-section contains the stripped mid-section. A tube has an interior with a diameter larger than the outer diameter of the optical fiber and has an opening through a wall of the tube to the interior. The tube and the optical fiber having the stripped mid-section extending through the tube define an annular space therebetween. Soldering means fills the annular space. Sealing means holds the optical fiber approximately centered in ends of the tube. The stripped mid-section is contained by the tube, the sealing means and the soldering means.

15 Claims, 1 Drawing Sheet

IN-LINE SOLDER SEAL FOR OPTICAL FIBER

FIELD OF THE INVENTION

This invention relates to packaging optical fibers, and more particularly to hermetically sealing an optical fiber to a metal housing.

BACKGROUND OF THE INVENTION

Optical communication systems are desirable because of the wide bandwidths available for the information signal channels. In general, there is a direct trade off between increased bandwidth capabilities and vulnerability to large scale channel disruption by transmission medium failure. The robustness of an optical fiber is increasingly important with increasing bandwidth capability.

Signals fade with distance while traveling through any type of cable. The greater the distance the fainter the signal becomes. When a digital signal fades the bit error rate rises rapidly. When an analog signal fades it becomes distorted or noisy. Communication system utilize amplifiers or repeaters coupled to the cables to overcome this problem.

Lightwave repeaters, regenerators and optical amplifiers extend transmission distances of light signals. Inserted into a fiber system at a point where the original light signal becomes weak, they generate a stronger signal, effectively extending the operating distances. Repeaters and regenerators convert the light signal into an electrical signal before amplifying the signal. Optical amplifiers directly amplify the light signal. It is desirable to hermetically seal the repeaters, regenerators, optical amplifiers and other devices within a housing to prevent deterioration due to atmospheric conditions. This is particularly necessary for buried terrestrial or submarine optical fiber systems. The fact that the optical fiber cores have a very small diameter (typically 8 to 9 $\mu$m) makes them susceptible to damage and difficult to handle.

U.S. Pat. No. 4,119,363, entitled "Package For Optical Devices Including Optical Fiber-To-Metal Hermetic Seal", issued on Oct. 10, 1978 to Irfan Camlibel et al, discloses an optical fiber that is hermetically sealed to a metal housing, where solder filling a thin walled metal tube forms a hermetic seal. The end of the optical fiber that is inserted into the tube is stripped to the bare optical fiber.

U.S. Pat. No. 4,699,456, entitled "Hermetic Fiber Seal", issued on Oct. 13, 1987 to Donald R. Mackenzie, discloses an assembly for hermetically sealing and aligning optical fibers. An end of the optical fiber is stripped to the bare optical fiber before inserting into the device. Pressure from a flange onto a gold ring forms the hermetic seal.

A bare optical fiber, stripped of its protective outer cover is particularly vulnerable to damage during manufacturing, assembly, maintenance and operation. This vulnerability reduces yields, increases failures and raises the cost of operation and maintenance of an optical fiber system. The robustness of an optical fiber is increasingly important with increasing bandwidth capability.

Therefore, there is a need for a more robust optical fiber hermetic seal.

SUMMARY OF THE INVENTION

The present invention is an in-line hermetic seal for an optical fiber. The optical fiber has an outer diameter and a stripped mid-section. A tube has an interior with a diameter larger than the outer diameter of the optical fiber and has an opening through a wall of the tube to the interior. The tube and the optical fiber having the stripped mid-section extending through the tube define an annular space therebetween. Soldering means fills the annular space. Sealing means holds the optical fiber approximately centered in ends of the tube. The stripped mid-section is contained by the tube, the sealing means and the soldering means. A method in accordance with the present invention is also described.

DESCRIPTION OF THE DRAWINGS

The present invention is described in detail below in conjunction with the drawings, of which.

DETAILED DESCRIPTION OF VARIOUS ILLUSTRATIVE EMBODIMENTS

Figure 1:
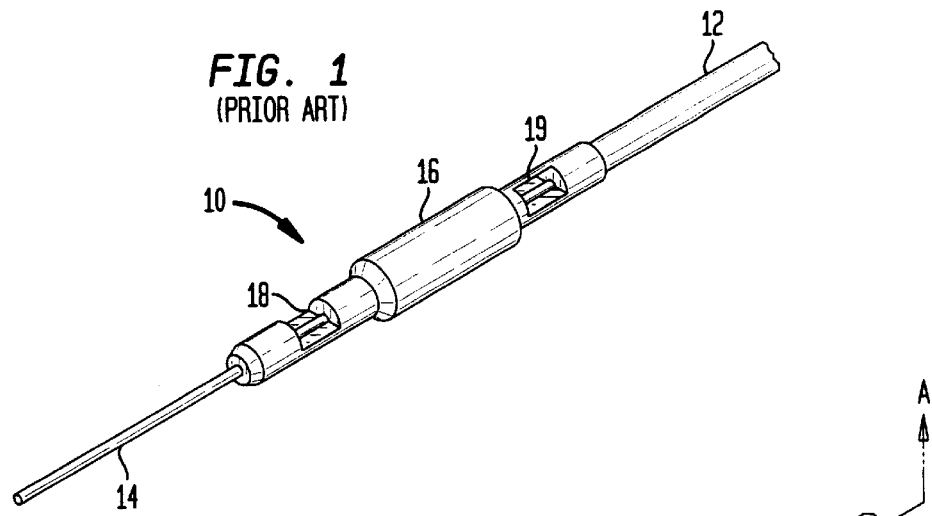
FIG. 1 shows a prior art optical fiber hermetic solder seal.

Referring to FIG. 1 there is shown a detail of a prior art optical fiber hermetic solder seal 10 which is presently used in commercial practice. The optical fiber 12 is stripped on one end to expose the bare optical fiber 14. The bare optical fiber 14 is inserted into a hollow solder seal tube 16. The hollow solder seal tube 16 is filled with solder through a first opening 18. Optionally, if the first opening 18 is omitted, solder may be wicked into the hollow solder seal tube 16 from the bare optical fiber 14 end. The assembly is permitted to cool so that the solder forms a hermetic seal. A second opening 19 permits inspection during assembly and after cleaning is utilized for the injection of epoxy between the optical fiber 12 and the interior of the hollow solder seal tube 16. The prior art optical fiber hermetic solder seal 10 may then be suitably attached to a housing. The bare optical fiber 14 which protrudes from the hollow solder seal tube 16 is exposed and thus highly susceptible to mechanical and environmental damage.

Figure 2:
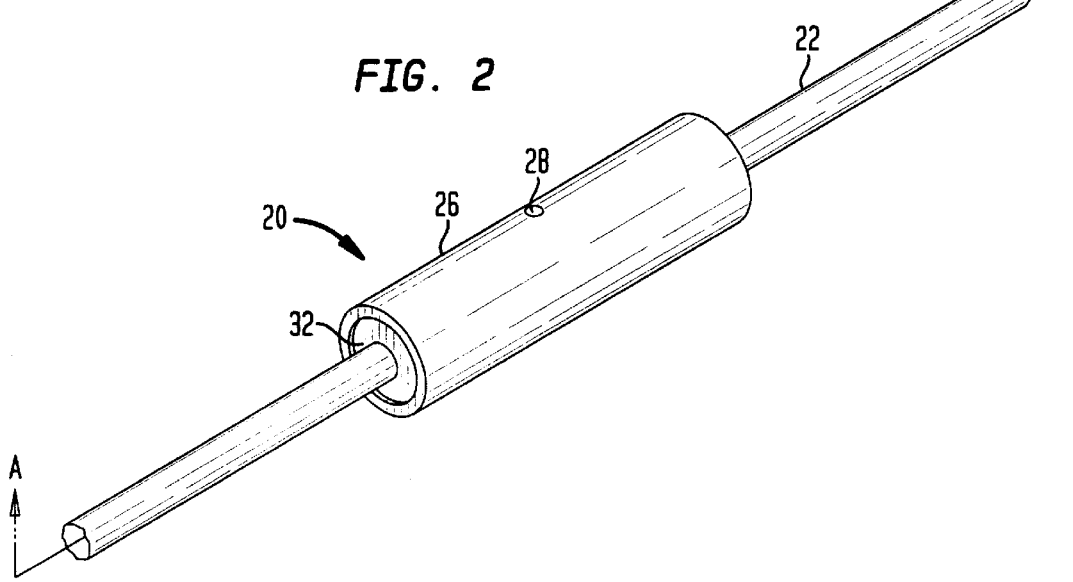
FIG. 2 shows the in-line solder seal with an optical fiber.
Figure 3:
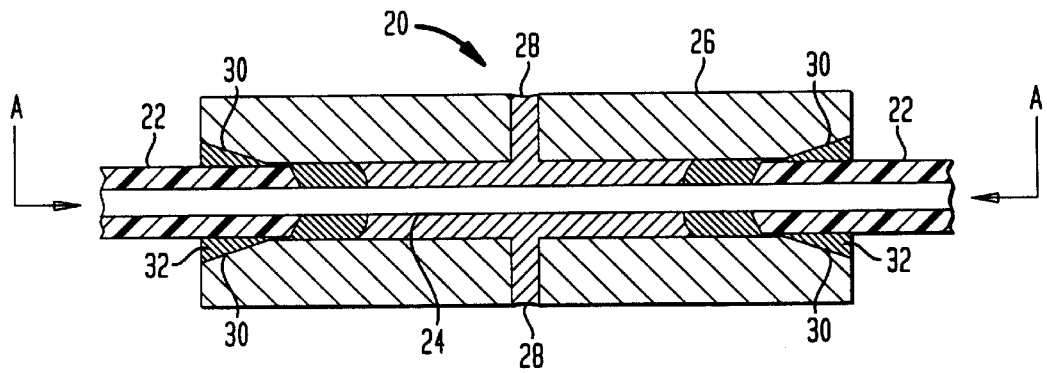
FIG. 3 shows a longitudinal cross section A—A of the in-line solder seal.

Referring to FIG. 2 in conjunction with FIG. 3 there is shown an optical fiber in-line solder seal 20. FIG. 3 is a longitudinal cross section A—A of the optical fiber in-line solder seal 20 with the same components being assigned the same number. An optical fiber 22 with a stripped mid-section 24 (the protective covering having been removed exposing the inner glass optical fiber) is axially aligned within an in-line hollow solder seal tube 26. The in-line hollow solder seal tube 26 is typically made of a material such as Kovar, which is selected for its thermal expansion characteristics. The in-line hollow solder seal tube 26 has an interior diameter sufficiently large to permit the unstripped end of the optical fiber 22 to be inserted. The in-line hollow solder seal tube 26 has a fill opening 28 through the wall into the interior. Optionally an additional fill opening similar to fill opening 28 may be present. The interior of the in-line hollow solder seal tube 26 has tapered ends 30. Epoxy plugs 32 are at the ends of the in-line hollow solder seal tube 26 and hold the optical fiber 22. The interior cavity defined by the in-line hollow solder seal tube 26, optical fiber 22 and the epoxy plugs 32 contains solder. Optionally the interior mid-section of the in-line hollow solder tube 26 can have a larger diameter than the ends. The solder can be approximately 60% Sn and 40% Pb or other suitable composition.

The optical fiber 22 is stripped in the mid-section 24 by bending the optical fiber 22 into a U shape and dipping the U shape into a stripping solution. The stripping solution then removes the outer layer of the optical fiber which exposes a section of the bare optical fiber. The optical fiber 22 with the stripped mid-section 24 is straightened from the U shape after stripping and is plated with nickel and gold. The optical fiber 22 must be straight when plated otherwise the plating may crack and be damaged. The plating covers the stripped mid-section 24 and over laps slightly beyond in order to ensure that there is no bare glass exposed.

U.S. Pat. No. 5,380,559, entitled "Electroless Metallization Of Optical Fiber For Hermetic Packaging", issued to Robert W. Filas et al. on Jan. 10, 1995, which is incorporated herein by reference, describes an electroless process to deposit nickel and gold onto optical fibers using aqueous chemistry. The sensitization of a surface of an optical fiber is accomplished using a dilute aqueous stannous fluoride solution in absence of oxygen. The sensitized optical fiber is immersed in a palladium chloride/HCl aqueous solution and commercially available electroless nickel and electroless gold solutions.

The optical fiber 22 is inserted into the in-line hollow solder seal tube 26 such that the stripped mid-section 24, which is now plated, is aligned to be contained within the in-line hollow solder seal tube 26. The tapered ends 30 of the interior of the in-line hollow solder seal tube 26 assist in the insertion of the optical fiber 22. Heat sinks may be attached to the ends of the in-line hollow solder seal tube 26 which will limit the flow of the solder. Optionally the interior mid-section of the in-line hollow solder seal tube 26 can have a larger diameter than the ends in order to assist in controlling the flow of the solder. An interior cavity, which is annular, is defined by the in-line hollow solder seal tube 26 and the optical fiber 22. The annular interior cavity is filled with solder through fill the opening(s) 28. The assembly is permitted to cool so that the solder forms a hermetic seal. After cleaning to remove flux from soldering, epoxy plugs 32 are inserted into the ends of the in-line hollow solder seal tube 26 so as to fill the gap between the optical fiber 22 and the interior wall of the in-line hollow solder seal tube 26. The optical fiber in-line solder seal 20 may then be suitably attached to a housing. The insertion of the optical fiber 22 through the in-line hollow solder seal tube 26, filling with solder and insertion of the epoxy plugs 28 takes place at a location suitably isolated so that there is no danger of the stripping, plating, epoxy application, soldering or fluxing contaminating critical optical devices.

The optical fiber 22 which protrudes from the in-line hollow solder seal tube 26 does not have exposed a bare optical fiber which is highly susceptible to mechanical and environmental damage.

Numerous modifications and alternative embodiments of the invention will be apparent of those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claim is reserved.

What is claimed is:

1. An in-line hermetic seal for an optical fiber having an outer diameter and a plated stripped mid-section comprising:
    a tube having an interior with a minimum diameter larger than the outer diameter of the optical fiber and having an opening through a wall to said interior;
    the optical fiber having the plated stripped mid-section extending through said tube and defining an annular space therebetween; and
    soldering means filling said annular space;
    wherein the plated stripped mid-section is contained by said tube, said sealing means and said soldering means.

2. The in-line hermetic seal as recited in claim 1 further comprising sealing means for holding the optical fiber approximately centered in ends of said tube.

3. The in-line hermetic seal as recited in claim 1 wherein ends of said interior are tapered.

4. The in-line hermetic seal as recited in claim 2 wherein said sealing means is an epoxy.

5. The in-line hermetic seal as recited in claim 1 wherein said tube is made of Kovar.

6. The in-line hermetic seal as recited in claim 1 wherein said tube has a center interior diameter larger than said minimum diameter.

7. The in-line hermetic seal as recited in claim 1 wherein said solder means bonds to said plated stripped mid-section and forms a hermetic seal.

8. The in-line hermetic seal as recited in claim 1 wherein said soldering means comprises approximately 60% Sn and 40% Pb.

9. An in-line hermetic seal comprising:
    a tube having an interior and having an opening through a wall to said interior;
    an optical fiber having an outer diameter and a stripped mid-section wherein said optical fiber extends through said tube defining an annular space therebetween; and
    soldering means filling said annular space;
    wherein said stripped mid-section is contained by said tube, said sealing means and said soldering means.

10. The in-line hermetic seal as recited in claim 9 further comprising sealing means for holding said optical fiber approximately centered in said tube.

11. The in-line hermetic seal as recited in claim 9 wherein ends of said interior are tapered.

12. The in-line hermetic seal as recited in claim 10 wherein said sealing means is an epoxy.

13. The in-line hermetic seal as recited in claim 9 wherein said tube is made of Kovar.

14. The in-line hermetic seal as recited in claim 9 wherein said solder means bonds to said stripped mid-section and forms a hermetic seal.

15. The in-line hermetic seal as recited in claim 9 wherein said soldering means comprises approximately 60% Sn and 40% Pb.

* * * * *